US009531561B2

(12) United States Patent
Kwon et al.

(10) Patent No.: US 9,531,561 B2
(45) Date of Patent: Dec. 27, 2016

(54) APPARATUS AND METHOD FOR EXTENDING NETWORK AREA

(71) Applicant: Samsung Electronics Co., Ltd., Gyeonggi-do (KR)

(72) Inventors: Soon-Hwan Kwon, Gyeonggi-do (KR); Hong-Uk Woo, Seoul (KR); Kwan-Lae Kim, Gyeonggi-do (KR); Sung-Jin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/685,125

(22) Filed: Apr. 13, 2015

(65) Prior Publication Data

US 2015/0222451 A1 Aug. 6, 2015

Related U.S. Application Data

(63) Continuation of application No. 13/334,830, filed on Dec. 22, 2011, now Pat. No. 9,009,255.

(30) Foreign Application Priority Data

Dec. 23, 2010 (KR) .................. 10-2010-0133921

(51) Int. Cl.
| | |
|---|---|
| *G06F 15/173* | (2006.01) |
| *H04L 12/28* | (2006.01) |
| *H04L 29/08* | (2006.01) |
| *H04L 12/911* | (2013.01) |

(52) U.S. Cl.
CPC ....... *H04L 12/2832* (2013.01); *H04L 12/2805* (2013.01); *H04L 47/783* (2013.01); *H04L 67/12* (2013.01); *H04L 67/16* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 7,412,538 B1 | 8/2008 | Eytchison et al. | |
| 7,483,958 B1 | 1/2009 | Elabbady et al. | |
| 7,486,951 B2 * | 2/2009 | Chen ................... | H04L 63/0272 370/351 |
| 7,724,753 B2 | 5/2010 | Naqvi et al. | |
| 7,912,972 B2 | 3/2011 | Park et al. | |
| 7,962,097 B2 | 6/2011 | Jung et al. | |
| 8,316,140 B2 | 11/2012 | Huettner | |
| 8,402,122 B2 | 3/2013 | Cho et al. | |
| 2002/0133534 A1 * | 9/2002 | Forslow .............. | H04L 12/4641 709/200 |
| 2003/0126239 A1 | 7/2003 | Hwang | |
| 2005/0165941 A1 | 7/2005 | Eytchison et al. | |
| 2005/0172056 A1 * | 8/2005 | Ahn ................................ | 710/72 |
| 2006/0009867 A1 * | 1/2006 | Leban et al. ..................... | 700/94 |
| 2006/0206934 A1 * | 9/2006 | Ammirata ........... | H04L 61/2015 726/15 |
| 2008/0120422 A1 | 5/2008 | Park et al. | |
| 2009/0216896 A1 * | 8/2009 | Wu et al. ....................... | 709/230 |
| 2010/0124236 A1 * | 5/2010 | Musti et al. .................. | 370/466 |
| 2011/0206052 A1 * | 8/2011 | Tan ..................... | H04L 12/4641 370/395.53 |

\* cited by examiner

*Primary Examiner* — Brian P Whipple
(74) *Attorney, Agent, or Firm* — The Farrell Law Firm, P.C.

(57) ABSTRACT

An apparatus and method for extending a network are provided. The method includes registering, by a transmission-side remote access agent in a first network, a plurality of transmission channels for transmitting data; receiving, by the transmission-side remote access agent, event request messages each including access information regarding an apparatus from a plurality of apparatuses located in a transmission-side network; storing, by the transmission-side remote access agent, access information included in the received event request messages, which cannot be used in a registered channel of a reception-side network in a second network; and converting, by the transmission-side remote access agent, the event request message to be used in the registered transmission channels, and transmitting the converted event request message to the reception-side network different from the transmission-side network.

19 Claims, 5 Drawing Sheets

APPARATUS AND METHOD FOR EXTENDING NETWORK AREA

PRIORITY

This continuation application claims priority under 35 U.S.C. §120 to U.S. patent application Ser. No. 13/334,830 (now in condition for allowance), which claimed priority under 35 U.S.C. §119(a) to a Korean Patent Application entitled "Apparatus and Method for Extending UPnP Network Area" filed in the Korean Industrial Property Office on Dec. 23, 2010 and assigned Serial No. 10-2010-0133921, the entire content of which in incorporated herein by reference.

BACKGROUND OF THE INVENTION

1. Field of the Invention

The present invention relates generally to an apparatus and a method for extending a network, and, more particularly, to a network area extension apparatus and method for extending an application range of a home network to an internet area.

2. Description of the Related Art

A home network generally includes a private network based on an Internet Protocol (IP). Such a home network connects various devices such as a Personal Computer (PC), a Smart Device, and a wireless device to a common network through middleware, which is a common virtual computing environment, in order to control the various devices.

Middleware enables communication between various devices by through peer-to-peer connection amongst the devices. Examples of proposed middleware include Home Audio/Visual Interoperability (HAVI), UPnP, Java Intelligent Network Infra-structure (JAVI), Home Wide Web (HWW), etc.

In a computing environment constructed through UPnP middleware among the above-listed examples of middleware, each device receives an allocation of an address from a server according to a Dynamic Host Configuration Protocol (DHCP), or an address selected through an auto IP designating function. Through the allocation of the address, devices communicate with each other, and search and inquiry are performed on a network.

A UPnP network technology is presently among the most frequently used home network technologies. The UPnP network defines a UPnP device, a UPnP service, and a protocol between the UPnP device and the UPnP service. Such a UPnP network includes a Controlled Device (CD), which is a home network device controlled while being connected to an IP based home network, and a Control Point (CP), which is a device controlling the controlled device. The control point is a device that performs a control for the controlled device. The control point requests an event from the controlled device, and receives the event from the controlled device. The controlled device is a device that performs a function determined according to a request of the control point. The controlled device transmits the requested event to the control point having requested the event when a state of the controlled device is changed.

Operation processes performed at respective steps during communication between UPnP network devices include an Advertisement process, a Discovery process, a Description process, a Control process, and an Event process.

In the Discovery process, the control point obtains link information indicating basic information and detailed information regarding devices located within the same network through a search message and an advertisement using a multicast protocol.

Meanwhile, a long polling technology among server push technologies corresponds to a technology in which, when a client transmits a HyperText Transfer Protocol (HTTP) request message, a server does not immediately respond to the message but piggybacks an event into a response message for the HTTP request message to transmit it when the event is generated. A Bayeux protocol using a concept of such a long polling technology can implement a publication/subscription system and perform one-to-one communication.

As described above, since the conventional UPnP network system is designed for the purpose of constructing a home network, the UPnP network cannot share information between two devices at random locations through an internet connection.

Further, conventional UPnP networking may be cumbersome in that devices supporting a protocol such as DLNA (Digital Living Network Alliance) must access the same network or construct an ad-hoc network in order to share data.

In order to address the above-mentioned problems, there is a UPnP Remote Access (RA) technology that implements UPnP networking by connecting a device of an outside network to a home network by using a VPN (Virtual Private Network). However, the UPnP RA technology is limited to interworking between an outside device and a home network, and a home network manager must directly set up a management console within the home. Further, there is a disadvantage in that the UPnP RA technology cannot operate for a network using NAT (Network Address Translation).

SUMMARY OF THE INVENTION

Accordingly, the present invention has been made to solve the above-stated problems occurring in the prior art, and the present invention provides an apparatus and a method for extending a UPnP network area, in which devices located on different networks can transmit data to each other by extending an application range of a home network to an internet area.

In accordance with an aspect of the present invention, a method of extending a network area is provided. The method includes registering, by a transmission-side remote access agent in a first network, a plurality of transmission channels for transmitting data; receiving, by the transmission-side remote access agent, event request messages each including access information regarding an apparatus from a plurality of apparatuses located in a transmission-side network; storing, by the transmission-side remote access agent, access information included in the received event request messages, which cannot be used in a registered channel of a reception-side network in a second network; and converting, by the transmission-side remote access agent, the event request message to be used in the registered transmission channels, and transmitting the converted event request message to the reception-side network different from the transmission-side network.

In accordance with another aspect of the present invention, there is provided a method of extending a network area is provided. The method includes receiving, by a reception-side remote access agent in a second network, an event request message including access information regarding a transmitting apparatus from a transmission-side remote access agent in a first network; converting, by the reception-side remote access agent, the access information regarding the transmitting apparatus to valid access information in a reception-side network; generating, by the reception-side remote access agent, a modified event request message including identification information corresponding to the access information regarding the transmitting apparatus in the received event request message; and transmitting, by the reception-side remote access agent, the generated modified event request message to an access module for an internet access.

In accordance with another aspect of the present invention, an apparatus for extending a network area is provided. The apparatus includes a memory; and a transmission-side remote access agent in a first network for registering a plurality of transmission channels for a data transmission, receiving event request messages each including access information regarding an apparatus from a plurality of apparatuses located in a transmission-side network, storing access information included in the received event request messages in the memory, converting the received event request message, which cannot be used in a registered channel of a reception-side network in a second network, to be used in the registered transmission channels, and transmitting the converted event request message to the reception-side network different from the transmission-side network.

In accordance with another aspect of the present invention, an apparatus for extending a network area is provided. The apparatus includes a reception-side remote access agent in a second network for receiving an event request message including access information on a transmitting apparatus from a transmission-side remote access agent in a first network, converting the access information on the transmitting apparatus to valid access information in a reception-side network, generating a modified event request message including identification information corresponding to the access information on the transmitting apparatus in the received event request message, and then outputting the modified event request message; and an access module for performing an internet access when the modified event request message is received.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. In the following description, a detailed explanation of known related functions and constitutions may be omitted to avoid unnecessarily obscuring the subject matter of the present invention.

Figure 1:
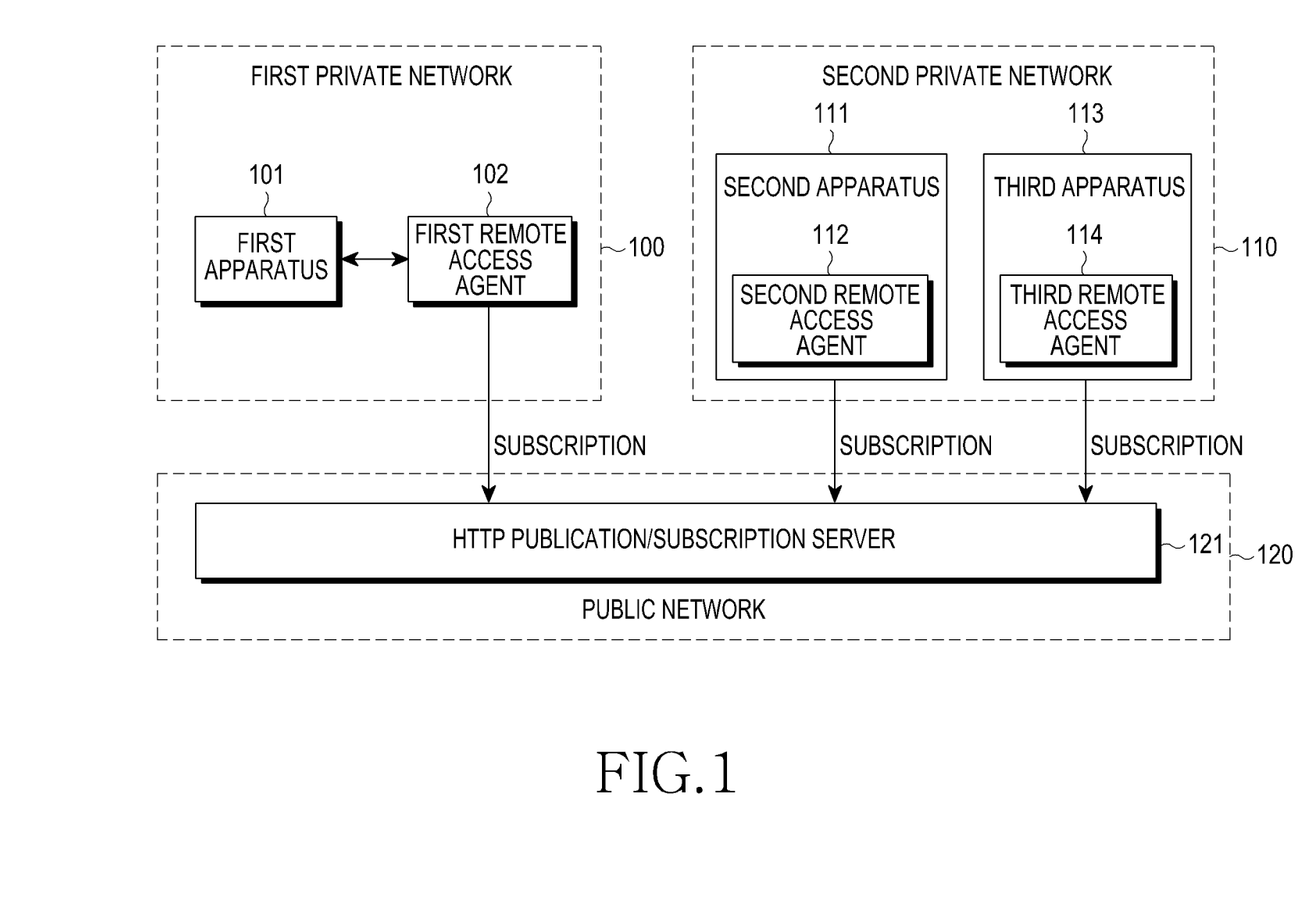
FIG. 1 is a diagram illustrating an example of a UPnP network system for implementing a process of registering a publication/subscription channel according to an embodiment of the present invention.

FIG. 1 is a diagram illustrating an example of a UPnP network system for implementing a process of registering a publication/subscription channel according to an embodiment of the present invention.

Referring to FIG. 1, a first apparatus 101 and a first remote access agent 102 are located in a first private network 100, and a second apparatus 111 including a second remote access agent 112 and a third apparatus 113 including a third remote access agent 114 are located in a second private network 110. Here, remote access agents may be included within each respective apparatus, and/or may be separately constructed outside of each respective apparatus. An HTTP publication/subscription server 121 is located in a public network 120.

In a system for extending a UPnP network constructed as described above, devices register channels used for transmitting data and the channels include a multicast channel and a unicast channel.

As shown in FIG. 1, the first apparatus 101, the second apparatus 102, and the third apparatus 103 request a subscription from the HTTP publication/subscription server 121 located in the public network 120, with the same channel name in order to register a multicast channel. At this time, the channel name is uniquely set within a currently connected publication/subscription system.

The first apparatus 101, the second apparatus 102, and the third apparatus 103 register their own respective apparatus identification information such as a Unique User IDentifier (UUID) as a unicast channel. The registration allows a unicast message to be transmitted to only a specific apparatus when a control point desires to transmit the unicast message to the corresponding specific apparatus.

As described above, data used for requesting the channel registration from the HTTP publication/subscription server 121 may have a data structure as shown in Table 1, below.

TABLE 1

[
 {
  "channel": "/some/name".
  "clientid": "83js73jsh29sjd92".
  "data":
  {
   "protocol":"udp||tcp".
   "protocol-info":"unicast||multicast||http".
    "src-uuid":"xxxxxxxx-xxxx-xxxx-xxxxxxxxxxxx".
   "dst-uuid":"xxxxxxxx-xxxx-xxxx-xxxxxxxxxxxx".
   "src-port":"xxxx" .
   "dst-port":"xxxx" .
   "upnp":"payload-of-upnp-packet"
  }
 }
]

In table 1, a protocol indicates whether the protocol

The data structure of Table 1 may be a User Datagram Protocol (UDP) data structure or a Transmission Control Protocol (TCP) data structure. A "protocol-info" element indicates an additional information provision related to a protocol, and indicates whether unicast or multicast is used in a case of the UDP data structure, and indicates whether HTTP is used in a case of the TCP data structure.

Further, when an src-uuid refers to a source UUID (i.e., a UUID of an apparatus of a transmission side) and a dst-uuid refers to a destination (i.e., a UUID of an apparatus of a reception side), a upnp refers to a UPnP packet. In a case of the UDP, the upnp indicates that a UDP header is included, and, in a case of the TCP, the upnp indicates that only a TCP payload is included.

Embodiments of the present invention may implement a UPnP wireless access without any modification of a conventional UPnP application at all. For this purpose, embodiments of the present invention may utilize a new independent software module concept called a Remote access Agent (hereinafter, referred to as a "RA"). The RA operates as a stand-alone apparatus like the first remote access agent 102 of FIG. 1, or may be installed in the second apparatus 111 or the third apparatus 113 as an independent software module like the second remote access agent 112 or the third remote access agent 114.

Figure 2:
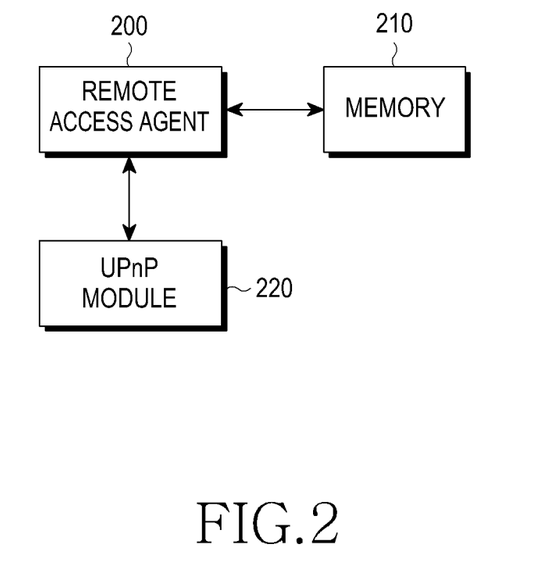
FIG. 2 is a diagram illustrating a construction of an apparatus including a remote access agent according to an embodiment of the present invention.

FIG. 2 is a diagram illustrating a construction of an apparatus including a remote access agent according to an embodiment of the present invention.

Referring to FIG. 2, an apparatus according to an embodiment of the present invention may include a remote access agent 200, a memory 210, and a UPnP access module 220.

In performing a NOTIFY process, the remote access agent 200 receives a NOTIFY message containing access information such as a UUID and an IP address from UPnP apparatuses located on a network, to which the remote access agent 200 belongs, and generates a first access information table for managing access information regarding the respective apparatus.

The remote access agent 200 converts the received NOTIFY message to data having a data structure such as shown in Table 1 to multicast the converted message to apparatuses of other networks through a preregistered transmission channel. At this time, the preregistered transmission channel refers to the preregistered multicast channel and a unicast channel as described above.

Meanwhile, when the NOTIFY message is received from the apparatuses of other networks, the remote access agent 200 replaces an address value of a location field of the received NOTIFY message with an access address of the remote access agent 200 and then unicasts the replaced access address to the UPnP access module 220. At this time, the address value of the location field is replaced by the remote access agent 200, since the address value included in the location field of the received NOTIFY message is valid only on other networks. Accordingly, the remote access agent 200 converts the address value included in the location field of the received NOTIFY message to an address of a network, to which the remote access agent 200 belongs, so that the UPnP access module 200 can receive the address value. For this purpose, the remote access agent 200 generates a second access information table including a UUID of a transmitting apparatus and an IP address and port information regarding the remote access agent 200.

In performing a Multicast Search (M-SEARCH) process, when an M-SEARCH packet is received from an apparatus on the same network, the remote access agent 200 searches the pre-stored first access information table for a UUID of an apparatus having transmitted the M-SEARCH packet. Next, the remote access agent 200 specifies the searched UUID in an identification information field (i.e., an src-uuid field) of an apparatus of a transmission side within the M-SEARCH packet, and transmits the identification information field (src-uuid) having the UUID to a remote access agent on another network through a multicast channel.

When the multicasted M-SEARCH packet is received, the remote access agent 200 generates a UDP socket for a local host and generates a third access information table including a UUID and a UDP port of an apparatus and a third access information table including a local UDP generated for communication with a UPnP transmission module.

The remote access agent 200 transfers the M-SEARCH packet to the UPnP access module 220 through the generated UDP socket and identifies a port having received a response when the response is received from the UPnP access module 220. Next, after the remote access agent 200 subscribes to a unicast channel by using access information corresponding to the identified port, the remote access agent 200 transmits the message to a remote access agent of an initial transmitting apparatus through the subscribed channel. At this time, a destination port of the UDP packet included in a payload of the response message is converted to an original UDP port.

Meanwhile, the remote access agent 200, which has received the response message of the M-SEARCH packet, extracts identification information (i.e., a ddst-uuid) of a reception-side apparatus from the response message, and obtains access information, such as IP information and port information corresponding to the extracted identification information, from the first access information table. Thereafter, the remote access agent 200 transmits the obtained access information to the apparatus having first transmitted the M-SEARCH packet through the unicast channel. At this time, the remote access agent 200 registers an IP address and port information regarding a transmitter included in Universal Resource Locator (URL) information regarding a location field in the first access information table, replaces the URL information regarding the location field with an IP address and port information regarding the remote access agent 200, and then transmits the replaced URL information regarding the location field to the apparatus through the UDP socket.

In performing a Description process, the remote access agent 200 restores a request URL of an HTTP GET request message transferred from the UPnP access module 220 to an original URL by using the second access information table, and then transmits the HTTP GET message to a remote access agent on another network through the unicast channel.

The remote access agent 200, after receiving the HTTP GET message, generates a TCP session, and transmits the HTTP GET message to a host included in a URL of the received HTTP GET message.

The remote access agent 200 receives a device description file from an HTTP server in response to the HTTP GET message, and transfers the device description file to the remote access agent on another network. At this time, as described above, host addresses included in URL information such as <controlURL> and <eventSubURL> included in the device description file are also replaced with addresses of remote access agents on other networks to be transmitted to the UPnP access module 220.

The memory 210 stores the first access information table generated by the remote access agent 200. At this time, the access information table may be structured, for example, according to Table 2 below.

TABLE 2

| UUID | IP address |
|---|---|
| f47ac10b-58cc-4372-a567-0e02b2c3d479 | 10.89.2.145 |
| 642ac10b-54ca-4132-f767-0ee2b2c3d4e9 | 10.89.2.201 |
| cef6aa1d-8295-a6bc-f404-ef2f8fbb4d21 | 10.89.2.231 |

The memory 210 stores the second access information table including access information such as a UUID and an IP address and a wireless TCP port information. At this time, the second access information table may be structured, for example, according to Table 3 below.

TABLE 3

| UUID | IP address | Wireless TCP port |
|---|---|---|
| ee24bc66-8ee8-f216-cb59-4693f0dd1b15 | 10.89.50.52 | 52235 |
| cef6aa1d-8295-a6bc-f404-ef2f8fbb4d21 | 10.89.50.167 | 45234 |
| d1769cc9-657b-3960-4c13-a89468071520 | 10.89.50.152 | 54673 |

The memory 210 also stores the third access information table including a UUID and a UDP port of an apparatus and a local UDP port generated for communication with a UPnP transmission module. At this time, the third access information table may be structured, for example, according to Table 4 below.

TABLE 4

| UUID | remote UDP port | local UDP port |
|---|---|---|
| ee24bc66-8ee8-f216-cb59-4693f0dd1b15 | 53235 | 67456 |
| cef6aa1d-8295-a6bc-f404-ef2f8fbb4d21 | 46234 | 23546 |
| d1769cc9-657b-3960-4c13-a89468071520 | 55673 | 87545 |

The UPnP access module 220 performs an HTTP access by using the NOTIFY message received from the remote access agent 200 in performing the NOTIFY process. At this time, the UPnP access module 220 uses the second access information table represented by table 3.

The UPnP access module 220 receives the M-SEARCH packet received through a UDP access from the remote access agent 200 in performing the M-SEARCH process, and transfers a response message for the received M-SEARCH packet to the remote access agent 200. At this time, the UPnP access module 220 transmits an HTTP/1.1 200 OK message.

In performing the Description process, the UPnP access module 220 transmits the HTTP GET request message to a TCP server embedded in the remote access agent in order to obtain a root device description of an apparatus.

As described above, according to an embodiment of the present invention, access information for each apparatus used for an HTTP access may be preset, and the remote access agent that converts data received from another network may be constructed such that the data can be used on a current network by using the preset access information, so that a UPnP wireless access may be implemented without requiring other changes to a conventional UPnP application.

Figure 3:
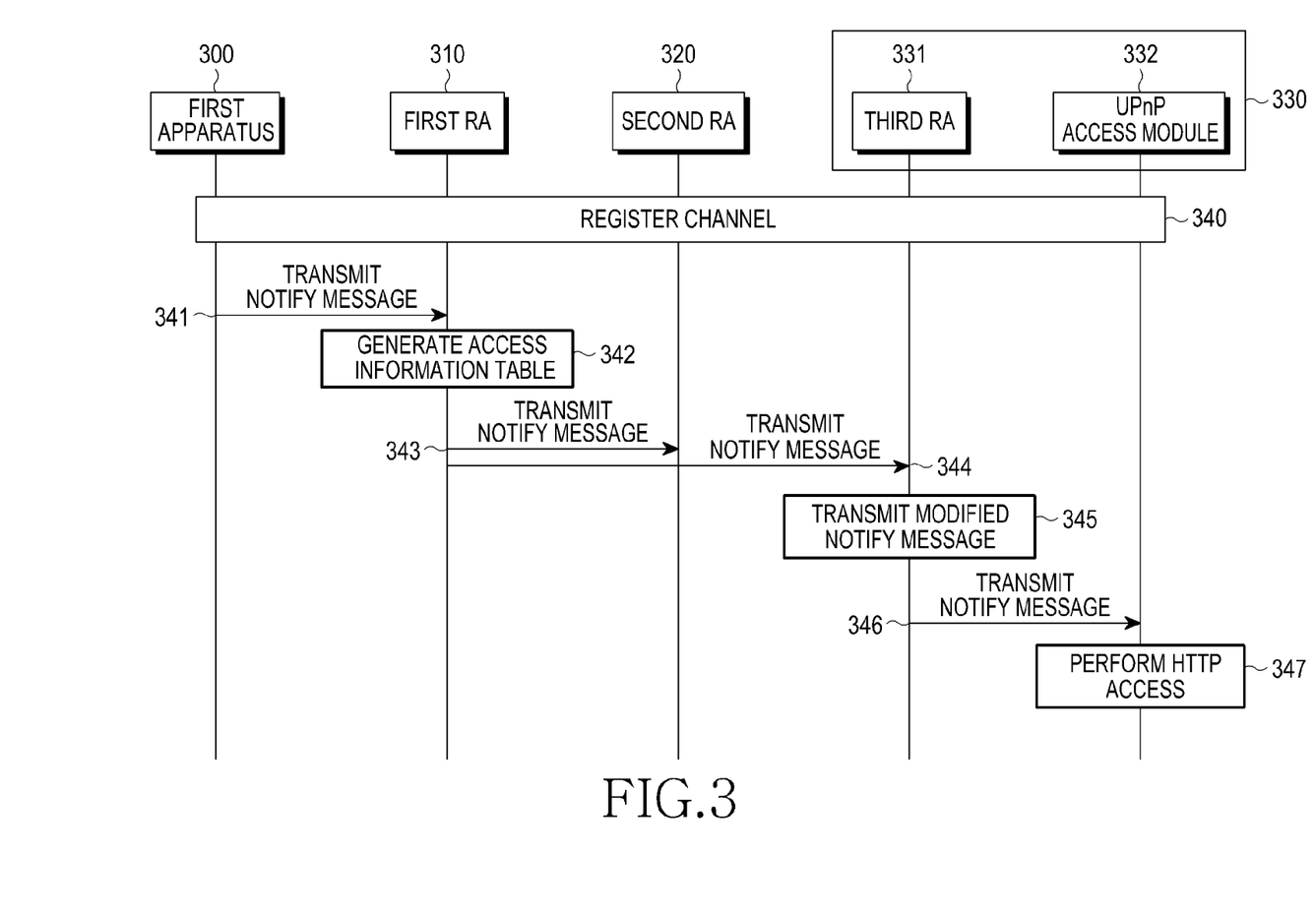
FIG. 3 is a flowchart illustrating a process of performing a NOTIFY operation in a UPnP network system according to an embodiment of the present invention.

FIG. 3 is a flowchart illustrating a process of performing a NOTIFY operation in a UPnP network system according to an embodiment of the present invention.

Referring to FIG. 3, n the present example according to an embodiment of the present invention, it is assumed that a first apparatus 300 and a first RA 310 are included in a first UPnP network, and the first apparatus 300 and the first RA 310 are independently implemented. It is also assumed that a second RA 320, and a third apparatus 330 including a third RA 331 and a UPnP access module 332 are included in a second UPnP network.

First, in step 340, the first RA 310, the second RA 320, and the third RA 331 register multicast and unicast channels for a data transmission, such as described herein with reference to FIG. 1.

In step 341, when the first apparatus 300 accesses a first network, the first apparatus 300 generates a NOTIFY message and multicasts the generated NOTIFY message on the first network.

In step 342, the first RA 310 generates the first access information table represented by Table 1 for managing access information, such as a UUID and an IP address of each apparatus included in the NOTIFY message received from UPnP apparatuses included in the first network to which the first RA 310 belongs.

When a value of a Notification Sub-Type (NTS) header filed of the received NOTIFY message is set to "ssdp: byebye", the first RA 310 deletes information regarding an apparatus having transmitted the corresponding NOTIFY message on the first access information table.

In steps 343 and 344, the first RA 310 converts the received NOTIFY messages to have a data structure according to Table 1 and transmits the converted NOTIFY message to the second RA 320 and the third RA 331 on the second network through the preregistered multicast channel.

In step 345, the third RA 331 replaces access information regarding a transmission side of the NOTIFY message with access information regarding the third RA 331, and adds identification information such as a UUID of the first apparatus to generate a modified NOTIY message.

In other words, since an address included the NOTIFY message received from the first RA 310 is a valid address only on the first network, the address cannot be used to load a root device description document by the UPnP access module 332 located in the second network. Therefore, the third RA 331 replaces an address value of a LOCATION header field of the received NOTIFY message with an IP address and port information regarding the third RA 331, and transfers a modified NOTIFY message, to which identification information such as a UUID of the first apparatus is added, to the UPnP access module 332. At this time, the third RA 331 stores originally stored access information regarding a transmission side and identification information regarding a transmitting apparatus in the second access information table.

For example, the LOCATION header field is specified in a form of LOCATION: http://localhost:port/uuid/{original url}, and such a LOCATION header field may be specified in LOCATION: http://localhost:50000/ee24bc66-8ee8-f216-cb59-4693f0dd1b15/pmr/PersonalMessageReceiver.xml.

In step 346, the third RA 331 transfers the generated modified NOTIFY message to the UPnP access module 332. In step 347, the UPnP access module 332 performs an HTTP access by using the received modified NOTIFY message. At this time, the UPnP access module 332 restores access information regarding an original apparatus of a transmission side by using the second access information table of Table 3 and then attempts an HTTP access through the corresponding access information.

As described above, according to embodiments of the present invention access information regarding each apparatus used for an HTTP access may be present and the remote access agent, which converts data received from another network in order to use the data on a current network by using the preset access information, may be constructed so that a UPnP remote access may be implemented without any change of a conventional UPnP application.

Figure 4:
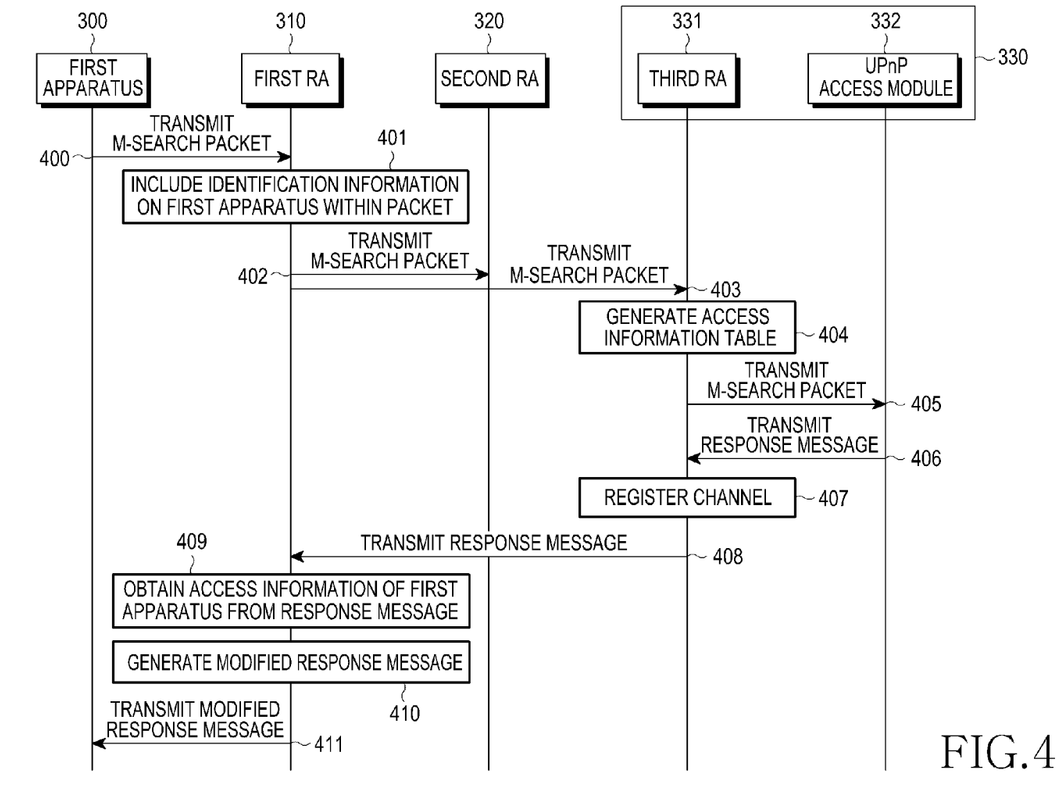
FIG. 4 is a flowchart illustrating a process of performing an M-SEARCH operation in a UPnP network system according to an embodiment of the present invention.

FIG. 4 is a flowchart illustrating a process of performing an M-SEARCH operation in a UPnP network system according to an embodiment of the present invention.

In the present example according to an embodiment of the present invention, it is assumed that the first apparatus 300 and the first RA 310 are included in the first UPnP network, and the first apparatus 300 and the first RA 310 are independently implemented. It is also assumed that the second RA 320, and the third apparatus 330 including the third RA 331 and the UPnP access module 332 are included in the second UPnP network.

Referring to FIG. 4, in step 400, the first apparatus 300 multicasts the M-SEARCH packet to apparatuses included in the first network.

In step 401, the first RA 301 searches a pre-stored first access information table for identification information regarding the first apparatus 300, and includes the searched identification information in the M-SEARCH packet. In other words, the first RA 310 specifies a searched UUID in an identification information field of an apparatus of a transmission side within the M-SEARCH packet.

In steps 402 and 403, the first RA 310 transmits the M-SEARCH packet to each of the second RA 320 and the third RA 331 through the multicast channel.

In step 404, when the M-SEARCH packet is received, the third RA 331 generates a transmission socket for a local host and generates a new access information table including access information regarding the first apparatus 300 and local access information generated for communication with the UPnP transmission module 332. In other words, the third RA 331 generates a UDP socket for the local host, and generates access information such as a UUID and a UDP port of the first apparatus and the third access information table represented by table 4 including the generated local UDP port.

In step 405, the third RA 331 transfers the M-SERCH packet to the UPnP access module 332 through the generated transmission socket. In step 406, the UPnP access module 332 transfers a response message for the received M-SEARCH packet to the third RA 331. At this time, the UPnP access module 332 transmits an HTTP/1.1 200 OK message.

In step 407, when the response message is received, the third RA 331 identifies access information for which the response message is received and registers the unicast channel of the first RA 310 by using identification information corresponding to the identified access information. In other words, the third RA 331 identifies a port having received the response message, and immediately subscribes a Bayeux unicast channel of the first RA 310 with a UUID corresponding to the port identified through the third access information table.

In step 408, the third RA 331 transmits the response message to the first RA 310 through the registered unicast channel. At this time, a destination port of a UDP packet included in a payload of the response message is converted to an original UDP port.

When the response message is successively transmitted, the third RA 331 stops the channel subscription, terminates the generated local UDP socket, and then deletes an entry of a corresponding UUID from the third access information table. If there is no 200 OK response from the UPnP access module 332, the third RA 331 deletes a corresponding local UDP socket and the entry from the third access information table after a predetermined time.

In step 409, the first RA 310 extracts identification information regarding the third RA 331 from the received response message, and obtains access information regarding the first apparatus 300 having first transmitted the M-SEARCH packet corresponding to the extracted identification information from the first access information table.

In step 410, the first RA 310 replaces access information regarding the third RA 331 with access information regarding the first RA 310 to generate a modified response message. At this time, the first RA 310 registers a transmitter included in URL information regarding a LOCATION field of the received response message, that is, an IP address and port information regarding the third RA 331 in the first access information table, and replaces the IP address and the port information regarding the third RA 331 with an IP address and port information regarding the first RA 310.

In step 411, the first RA 310 transmits the modified response message generated through a transmission socket to the first apparatus 300.

An inverse transmission travelling in an opposite direction of the direction according to the above-described processes operates identically to a transmission direction in which the NOTIFY message and the M-SEARCH message are transmitted from the first RA 310 to the third RA 320. However, when the remote access agent operates as an independent apparatus like the first RA 310, the remote access agent plays a role of a UPnP gateway within a corresponding network and only one remote access agent should exist on a local network. Therefore, when the remote access agent receives the NOTIFY message or the M-SEARCH message transmitted through the publication/subscription channel, the remote access agent transmits the message in a multicast manner.

As described above, according to embodiments of the present invention access information regarding each apparatus used for an HTTP access may be preset, and the remote access agent, which converts data received from another network such that the data can be used on a current network by using the preset access information, may be constructed so that a UPnP wireless access may be implemented without any change of a conventional UPnP application.

Figure 5:
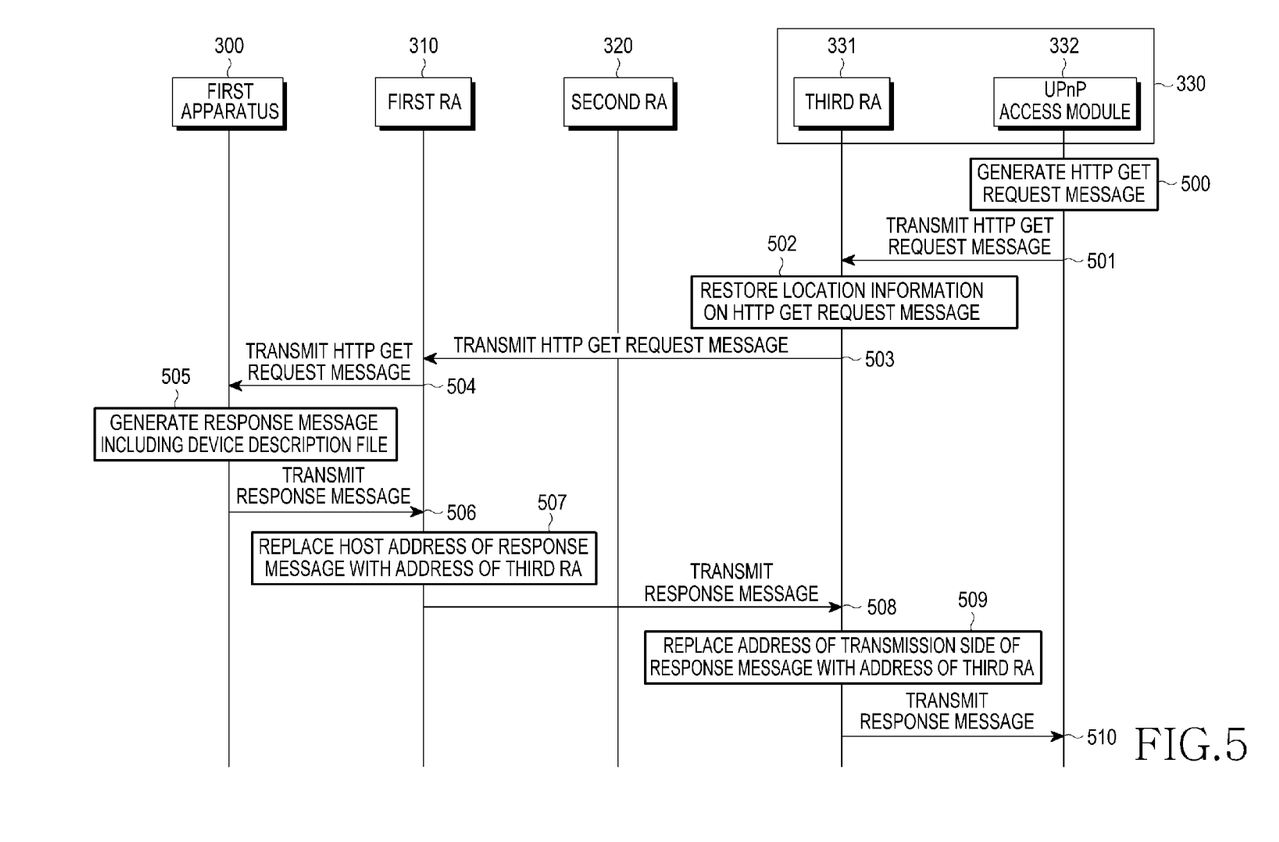
FIG. 5 is a flowchart illustrating a process of performing a Description operation in a UPnP network system according to an embodiment of the present invention.

FIG. 5 is a flowchart illustrating a process of performing a description operation in a UPnP network system according to an embodiment of the present invention.

Referring to FIG. 5, in step 500, the UPnP access module 332 generates an HTTP GET request message for requesting a device description file. In step 501, the UPnP access module 332 transfers the generated HTTP GET request message to the third RA 331. At this time, the UPnP access module 332 identifies location information regarding a device description file specified in a LOCATION header field received in a previous NOTIFY process, and transmits the HTTP GET request message to the third RA 331 by using the identified location information.

The inclusion of access information modified by the third RA 331 in the LOCATION header field enables transmission of the HTTP GET request message. In other words, since location information regarding an apparatus for requesting the device description file identified in the previous NOTIFY process is replaced with IP information regarding the third RA 331, the UPnP access module 332 transmits the HTTP GET request message to the third RA 331.

In step 502, the third RA 331 restores the location information for requesting the received HTTP GET request message to original location information. At this time, the third RA 331 performs the restoration by using the second access information table. Here, the original location information refers to location information regarding the first apparatus.

In step 503, the third RA 331 transmits the HTTP GET message to the first RA 310 through a preset unicast channel, i.e., the third RA 331 registers a transmission channel by using a UUID of a wireless apparatus generated in registering the publication/subscription channel, and transmits the HTTP GET message to the first RA 310 through the registered transmission channel.

In step 504, the first RA 310 generates a TCP session, and transmits the HTTP GET message received by the first apparatus 300 by using location information regarding the first apparatus 300 included in a URL of the received HTTP GET message. In step 505, the first apparatus 300 brings a device description file from an HTTP server of the first apparatus 300 to generate a response message including the device description file. In step 506, the first apparatus 300 transmits the response message to the first RA 310.

In steps 507 and 508, the first RA 310 replaces host addresses included in the URL of the device description file included in the response message with an address of the third RA 331, and then transmits the replaced response message to the third RA 331. In step 509, the third RA 331 replaces an address of a transmission side of the received response message with an address of the third RA 331. In step 510, the third RA 331 transmits the corresponding response message to the UPnP access module 332.

After transmission of the corresponding response message, Control, Event, and Presentation processes using an HTTP over TCP are also performed identically to the device description process.

As described above, according to embodiments of the present invention access information regarding each apparatus used for an HTTP access may be preset, and the remote access agent, which converts data received from another network such that the data can be used on a current network by using the preset access information, may be constructed so that a UPnP wireless access may be implemented without any change of a conventional UPnP application.

According to embodiments of the present invention, two devices randomly located in an internet-connected area can share information by an implementation of a small-scale local area network through a UPnP network area extension.

Further, embodiments of the present invention may provide improved and abundant user experiences to a user through implementing a UPnP remote access without any modification of a conventional UPnP application.

In addition, embodiments of the present invention may enable a user to conveniently enjoy media data by accessing a Digital Living Network Alliance Digital Media Server (DLNADMS) within the home by using a mobile phone outside the home, or to watch an image filmed by a mobile phone of a travelling family member through a TV within the home.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. A method of extending a network area by a first remote access agent in a first network, the method comprising:
receiving an event request message including access information from at least one apparatus located in the first network; and
transmitting the received event request message to at least one apparatus located in a second network through a predetermined at least one channel,
wherein transmitting the received event request message includes converting the event request message to data having a data structure to be used in the preregistered at least one channel for multicasting the converted event request message to the second network.

2. The method as claimed in claim 1, wherein the preregistered at least one channel includes a multicast channel and a unicast channel.

3. The method as claimed in claim 1, wherein the access information includes a Unique User Identifier (UUID) and an Internet Protocol (IP) address of the apparatus.

4. The method as claimed in claim 1, further comprising:
receiving a response message corresponding to the event request message from the second network;
obtaining access information of the at least one apparatus located in the first network from the response message; and
transmitting the response message to the at least one apparatus located in the first network based on the obtained access information.

5. The method as claimed in claim 4, wherein the obtained access information includes identification information and port information regarding the at least one apparatus located in the second network, together with an IP address and port information regarding the at least one apparatus located in the first network.

6. A method of extending a network area by a second remote access agent in a second network, the method comprising:
receiving an event request message including access information regarding at least one apparatus located in a first network from the first network;
converting the access information regarding the at least one apparatus located in the first network to valid access information in the second network;
generating a modified event request message including identification information corresponding to the access information regarding the at least one apparatus located in the first network, in the received event request message; and
transmitting the generated modified event request message to at least one apparatus located in the second network, each including an access module for performing an internet access when the modified event request message is received.

7. The method as claimed in claim 6, wherein the valid access information corresponds to an Internet Protocol (IP) address and port information regarding the second remote access agent.

8. The method as claimed in claim 7, further comprising:
receiving a response message including access information corresponding to the modified event request message from the at least one apparatus located in the second network; and
transmitting the response message to the at least one apparatus located in the first network through at least one channel preregistered in a public network at the second network.

9. The method as claimed in claim 8, wherein the preregistered at least one channel includes at least one of a multicast channel and a unicast channel.

10. The method as claimed in claim 8, wherein the access information regarding the at least one apparatus located in the second network includes identification information and port information regarding the at least one apparatus located in the second network, together with an IP address and port information regarding the at least one apparatus located in the first network.

11. An apparatus for extending a network area in a first network, the apparatus comprising:
   a memory; and
   a first remote access agent for receiving an event request message including access information from at least one apparatus located in the first network, and transmitting the received event request message to at least one apparatus located in a second network through a predetermined at least one channel,
   wherein the first remote access agent converts the event request message to data having a data structure to be used in the preregistered at least one channel for multicasting the converted event request message to the second network.

12. The apparatus as claimed in claim 11, wherein the memory stores the access information including a Unique User Identifier (UUID) and an Internet Protocol (IP) address of each apparatus.

13. The apparatus as claimed in claim 11, wherein the preregistered at least one channel includes a multicast channel and a unicast channel.

14. The apparatus as claimed in claim 11, wherein the first remote access agent receives a response message corresponding to the event request message from the second network, obtains access information of the at least one apparatus located in the first network from the response message, and transmits the response message to the at least one apparatus located in the first network based on the obtained access information.

15. An apparatus for extending a network area in second network, the apparatus comprising:
   a memory; and
   a second remote access agent for receiving an event request message including access information regarding at least one apparatus located in a first network from the first network, converting the access information regarding at least one apparatus located in a first network to valid access information in the second network, generating a modified event request message including identification information corresponding to the access information regarding the at least one apparatus located in the first network in the received event request message, and transmitting the generated modified event request message to at least one apparatus located in the second network, each including an access module for performing an internet access when the modified event request message is received.

16. The apparatus as claimed in claim 15, wherein the memory stores the valid access information and the valid access information corresponds to an Internet Protocol (IP) address and port information regarding the second remote access agent.

17. The apparatus as claimed in claim 16, wherein the second remote access agent receives a response message including access information corresponding to the modified event request message from the at least one apparatus located in the second network, and transmits the response message to the at least one apparatuses located in the first network through at least one channel preregistered in a public network at the second network.

18. The apparatus as claimed in claim 17, wherein the preregistered at least one channel includes at least one of a multicast channel and a unicast channel.

19. The apparatus as claimed in claim 18, wherein the access information regarding the at least one apparatus located in the second network includes identification information and port information regarding the at least one apparatus located in the second network, together with an IP address and port information regarding the at least one apparatus located in the first network.

* * * * *